US007891840B1

(12) United States Patent
Kang et al.

(10) Patent No.: US 7,891,840 B1
(45) Date of Patent: Feb. 22, 2011

(54) POLYGONAL RADIATION MODULE HAVING RADIATING MEMBERS WITHOUT LIGHT GUIDING BOARD

(75) Inventors: Chih-Chieh Kang, Yung Kang (TW); Jeng-Feng Lin, Yung Kang (TW); Ya-Ru Syu, Yung Kang (TW)

(73) Assignee: Southern Taiwan University, Yung Kang (TW)

( * ) Notice: Subject to any disclaimer, the term of this patent is extended or adjusted under 35 U.S.C. 154(b) by 0 days.

(21) Appl. No.: 12/692,260

(22) Filed: Jan. 22, 2010

(51) Int. Cl.
*F21V 33/00* (2006.01)

(52) U.S. Cl. ............... 362/249.02; 362/800; 362/97.1; 362/297

(58) Field of Classification Search ............ 362/97.1, 362/97.3, 97.4, 800, 249.02, 297, 307, 306
See application file for complete search history.

(56) References Cited

U.S. PATENT DOCUMENTS

| 4,989,122 | A | * | 1/1991 | Allekotte et al. ............ 362/97.1 |
| 5,136,483 | A | * | 8/1992 | Schoniger et al. ............ 362/545 |
| 5,365,411 | A | * | 11/1994 | Rycroft et al. ................ 362/20 |
| 6,053,621 | A | * | 4/2000 | Yoneda ........................ 362/245 |
| 7,237,927 | B2 | * | 7/2007 | Coushaine et al. .......... 362/554 |
| 2007/0091281 | A1 | * | 4/2007 | Radominski et al. .......... 353/94 |
| 2007/0217193 | A1 | * | 9/2007 | Lin et al. ..................... 362/245 |

* cited by examiner

*Primary Examiner*—Laura Tso
(74) *Attorney, Agent, or Firm*—Muncy, Geissler, Olds & Lowe, PLLC

(57) ABSTRACT

A polygonal radiation module having radiating members without a light guiding board for a backlight module or a lighting device includes a polygonal optical plate with a rising area having a rising surface defined at a center thereof, a plurality of radiating members, and a diffusion plate. The radiating members surrounding a periphery of the optical plate possess radiant half-intensity angles of the radiation below 15 degrees for respectively forming optic axial directions thereof. Whereby, the optic axial directions of the radiating members face to the rising surface, and radiation fields are individually generated as pivoted by the optic axial directions to cast at the rising surface. Thus, an even radiating surface caused by a diffusion of light source from the diffusion plate could be preferably obtained even if no light guiding board is applied.

7 Claims, 10 Drawing Sheets

POLYGONAL RADIATION MODULE HAVING RADIATING MEMBERS WITHOUT LIGHT GUIDING BOARD

BACKGROUND OF THE INVENTION

1. Field of the Invention

The present invention relates to a polygonal radiation module having radiating members without a light guiding board, especially to a radiating surface applied to a backlight module or other like emitting structure that does not require the light guiding board to achieve an even emission from a diffusion plate.

2. Description of the Related Art

Generally, in order to guide light for achieving an appropriate and multi-angled reflection, the backlight module would be commonly installed with a light guiding board. "A side-edged backlight module" disclosed in R.O.C. patent No. M359718 includes a plurality of LEDs, a light guiding board, a bright enhancement film, and a diffusion plate. Wherein, each LED has a radiating surface, and the radiating surfaces of the LEDs face to the same direction. The light guiding board disposed at one side of the LEDs has an incident plane, an emission plane, and a bottom. Wherein, the incident plane of the light guiding board faces to the radiating surfaces of the LEDs, the emission plane of the light guiding board adjacently connects to one side of the incident plane, and the bottom of the light guiding board disposed in correspondence with the emission plane adjacently connects to the other side of the incident plane, so that a plurality of micro-optical structures and flat areas are formed. Herein, the flat areas and the incident plane converge on a boundary. Moreover, the flat areas are respectively disposed in the relationship to the radiating surface, the bright enhancement film is provided above the emission plane of the light guiding board, and the diffusion plate is set upon the bright enhancement film. However, some shortcomings exist in such disclosure:

1. LCDs that mostly employ the backlight module are developed thinner. However, the conventional light guiding board of the backlight module is unfavorable for decreasing the thickness of the integral LCD. Further, since the light guiding board absorbs the light source, the output efficiency of the backlight module would thence be lowered. Additionally, the installation of the light guiding board adversely increases the manufacturing procedure, which consequently raises the cost of producing the backlight module.

2. The light sources of the backlight module are respectively disposed at the two sides of the light guiding board. As a result, the illumination would perform well at the two sides of the light guiding board; however, the center of the light guiding board would possess a weak illumination.

"Planar light source device and display device using the same device" disclosed in U.S. Pat. No. 7,350,951 replaces the typical light guiding board by varying an optical reflector disposed at a bottom thereof to construct an emission structure. Whereby, the output of the light could be increased. However, shortcomings still exist in such disclosure:

Although such disclosure conquers the poor output efficiency from the light guiding board, the side-edged light source still merely provides the two sides of the light guiding board with higher illumination, but the center thereof with lower illumination. Moreover, since the optical reflector has its middle section raised, certain light sources may not widely reflect within the optical reflector. As a result, the backlight module still provides uneven illumination.

SUMMARY OF THE INVENTION

It is an object of the present invention to provide a polygonal radiation module having radiating members without a light guiding board for conquering the shortcomings of the conventional radiating modules.

The polygonal radiating module in conformity with the present invention comprises:

an optical plate formed by a polygon including at least one rising area defined at a center thereof; the rising area being formed by a rising surface; a plurality of radiating members surrounding a periphery of the optical plate; wherein, radiant half-intensity angles of the radiating members being defined below 15 degrees, and the radiating members respectively radiating through optic axial directions that face to the rising surface; a radiation field being diffusively formed from a pivoting of the optic axial directions to cast at the rising surface; and a diffusion plate being disposed above the rising area of the optical plate.

The radiant half-intensity angles of the radiating members are defined between 5 degrees to 15 degrees.

Preferably, the radiating members are light emitting diodes tubes.

Preferably, a reflecting housing is connected to the periphery of the optical plate, the radiating members are fixed in the reflecting housing, and the diffusion plate is connected to the reflecting housing.

Preferably, an optical film is provided on the optical plate.

Preferably, the rising surface of the rising area of the optical plate is formed with a plurality of irregular notches.

Preferably, the rising surface of the rising area of the optical plate is formed with a plurality of V-shaped notches.

Accordingly, the present invention achieves the following advantages:

1. The radiating members surrounding on the periphery of the optical plate solves the problem of the uneven illumination in the side-edged radiating module; namely, the sides installed with the radiating members and the sides without the radiating members would possess the same illumination.

2. Since the optical plate in polygon is formed by a conically raised area whose periphery is surrounded by radiating members, light sources are able to reflect pursuant to multiple angles within the optical plate. As a result, the light source extensively emitted from the diffusion plate would be more even.

DETAILED DESCRIPTION OF THE PREFERRED EMBODIMENTS

Figure 1:
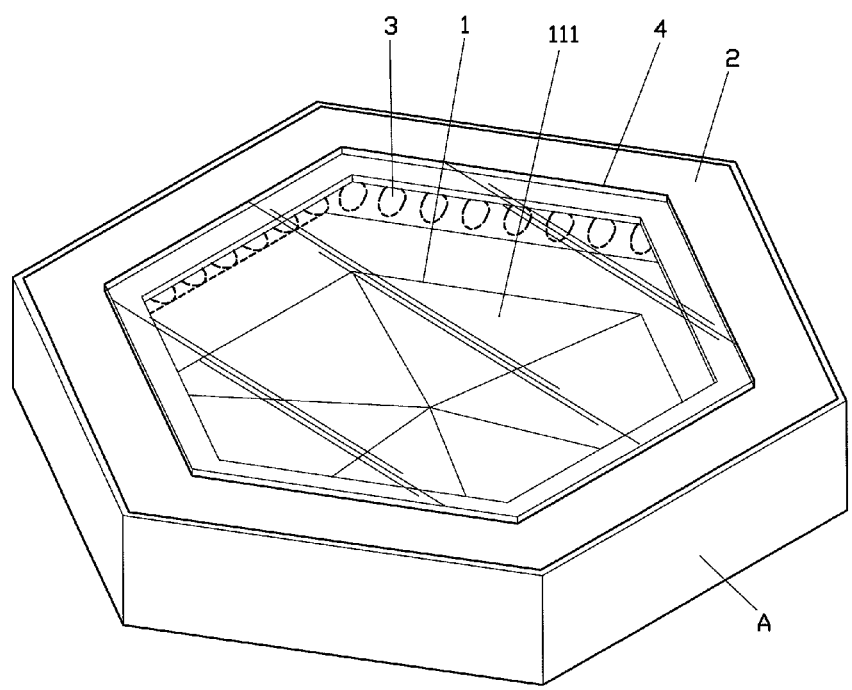
FIG. 1 is a perspective view showing the present invention.
Figure 2:
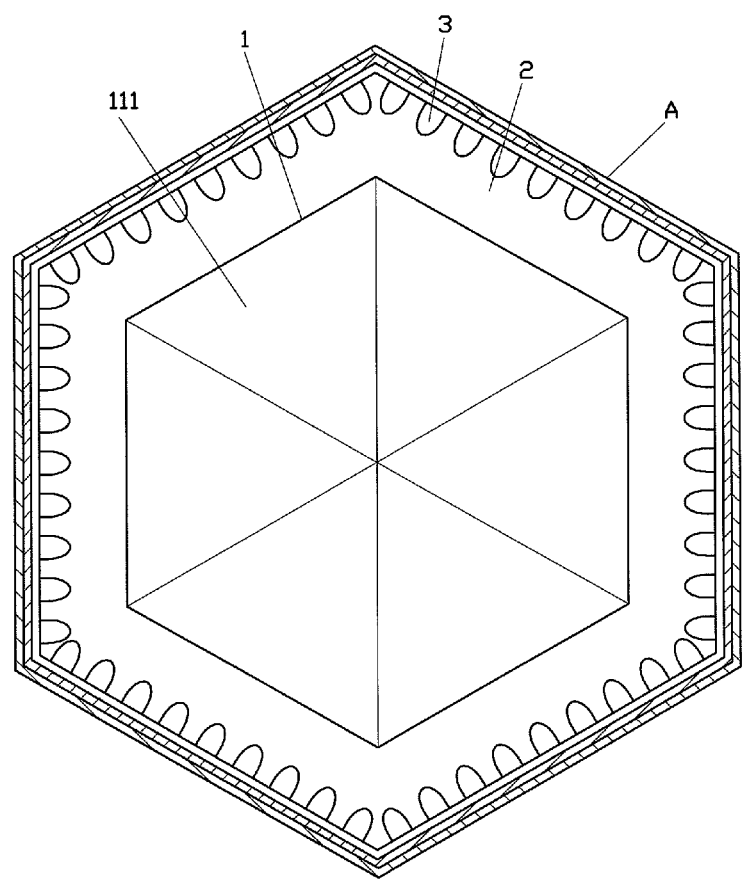
FIG. 2 is a top view showing the radiating members surrounding the periphery of the optical plate.
Figure 3:
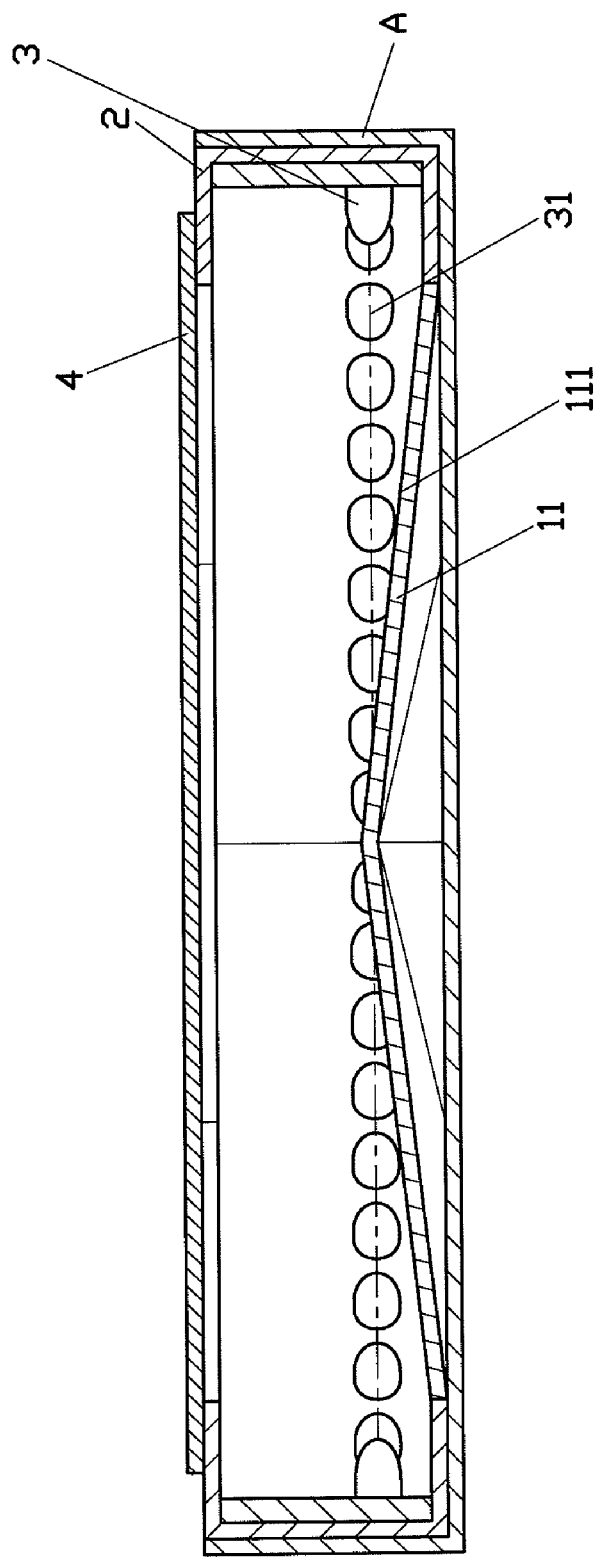
FIG. 3 is a cross-sectional view showing the optical axial direction parallel to the rising surface.

Referring to FIGS. 1 to 3, a polygonal radiation module having radiating members without a light guiding board according to a preferred embodiment of the present invention is mounted on a frame (A). The present invention comprises an optical plate (1), a reflecting housing (2), a plurality of radiating members (3), and a diffusion plate (4).

Figure 4:
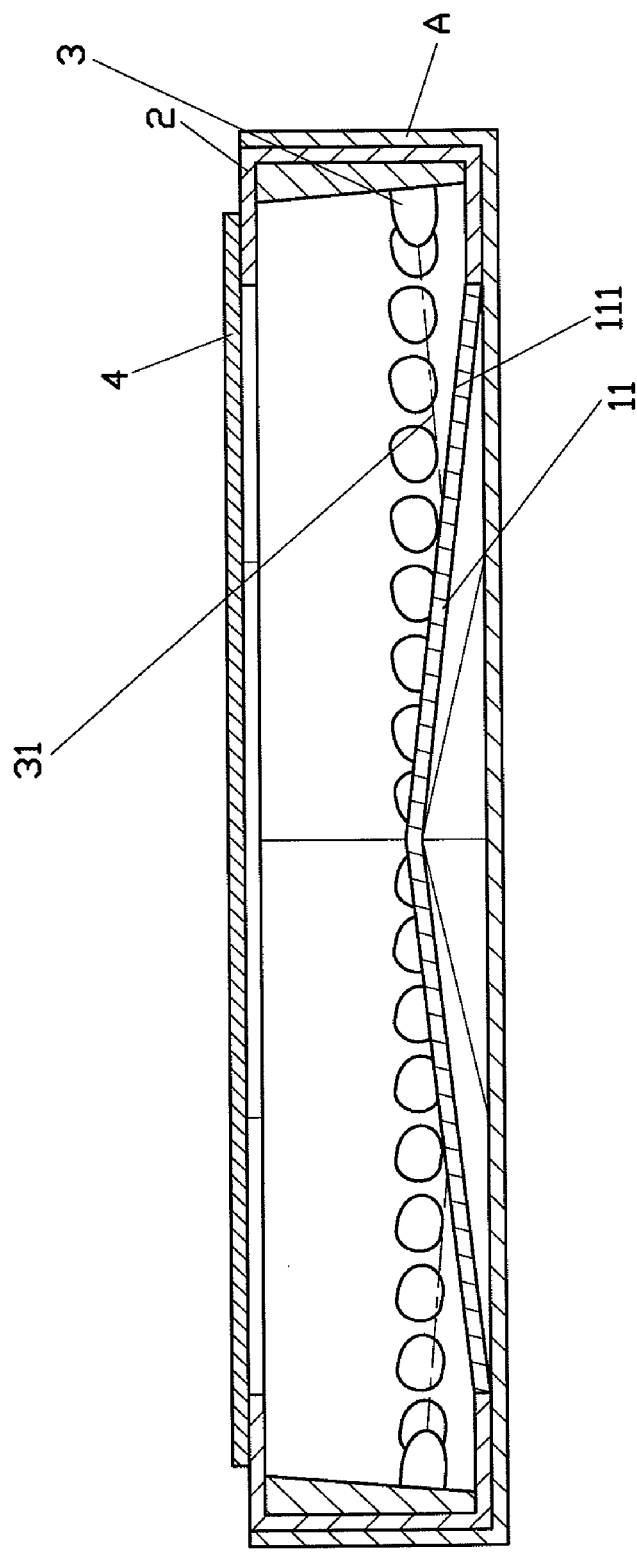
FIG. 4 is a cross-sectional view showing the optic axial direction slanted with respect to the rising surface.
Figure 6:
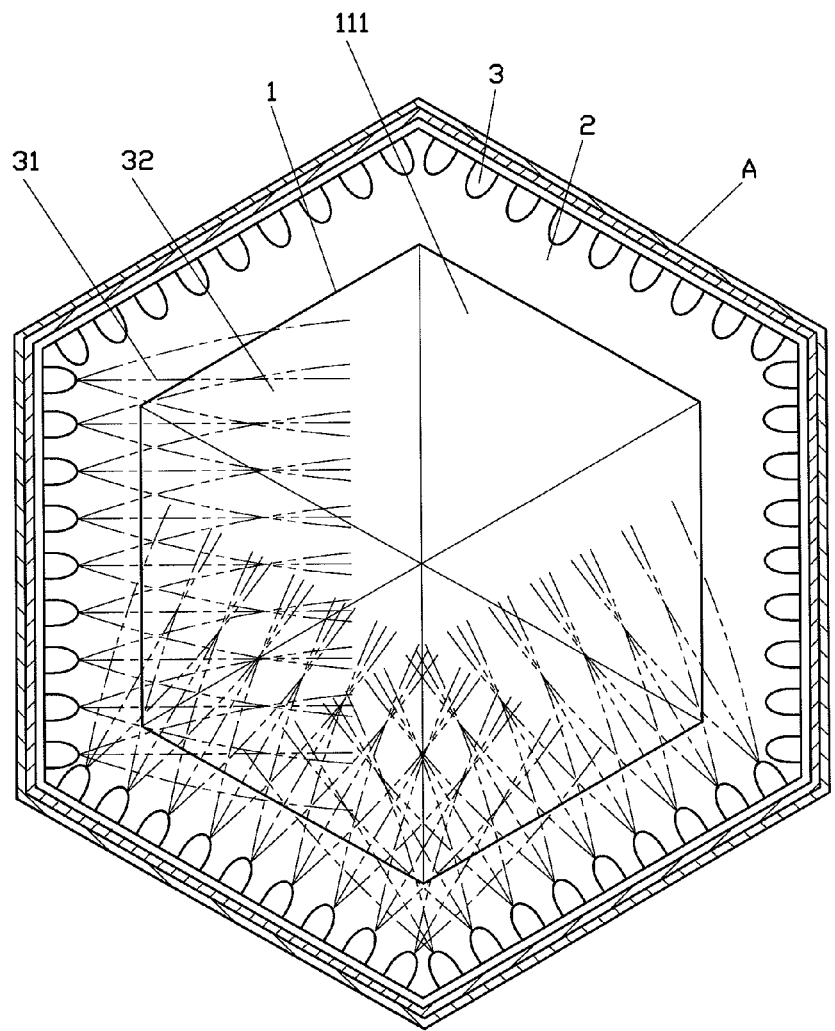
FIG. 6 is a schematic view showing the radiation field generated from the radiating members casting at the rising surface.

The optical plate (1) is formed by a polygon. In this embodiment, the polygon is formed by a hexagon. Wherein, the optical plate (1) includes at least one rising area (11) defined at a center thereof. The rising area (11) is formed by a rising surface (111). The reflecting housing (2) is connected to a periphery of the optical plate (1). The plurality of radiating members (3) adopting LED tubes surround the periphery of the optical plate (1) and fixed in the reflecting housing (2). Wherein, radiant half-intensity angles of the radiating members (3) are defined below 15 degrees with a high directivity. As it should be, when the radiant half-intensity angles of the radiating members (3) are defined between 5 degrees to 15 degrees, a best performance of the present invention could be achieved. Additionally, the radiating members (3) are contributed to form respective optic axial directions (31) that face to the rising surface (111). As shown in FIGS. 3 and 4, the radiating members 3 could either parallelly or slantingly emit their light sources true to the rising surface (111). A radiation field (32) is diffusively formed from a pivoting of the optic axial directions (31) to cast at the rising surface (111). In FIG. 6, in order to prevent an unclear drawing, only three optic axial directions (31) and the corresponding radiation fields (32) of the radiating members (3) impinging on the optical plate (1) are shown. The diffusion plate (4) is disposed above the rising area (11) of the optical plate (1). In this embodiment, the diffusion plate (4) is connected to the reflecting housing (2).

Figure 5:
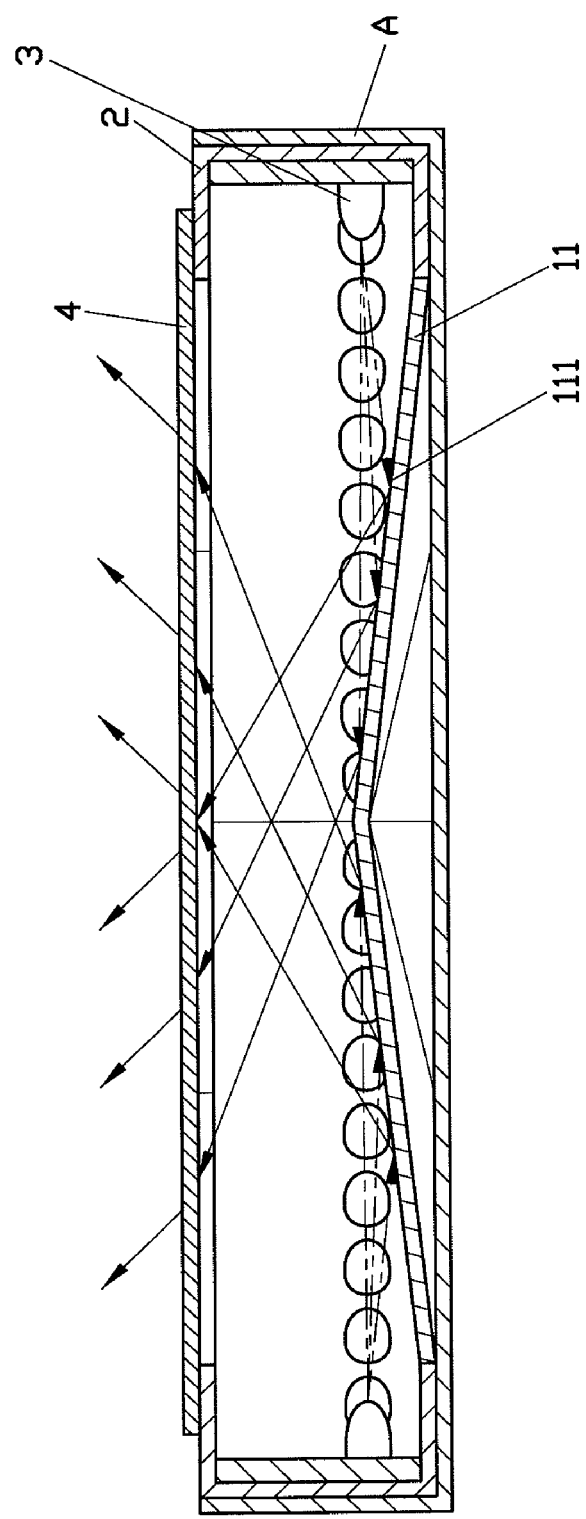
FIG. 5 is a schematic view showing that the light sources are evenly emitted from the diffusion plate when in use.

Referring to FIGS. 5 and 6, when in use, since the radiant half-intensity angles of the radiating members (3) are defined below 15 degrees, the radiating members (3) are able to possess the high directivity. Moreover, the optic axial directions (31) formed thereby face to the rising surface (111), and the radiation field (32) projects into the rising surface (111). As a result, most light sources would cast at the rising surface (111) of the optical plate (1), so that the illumination scattered from the diffusion plate (4) adjacent to the radiating members (3) could be decreased, avoiding the periphery of the diffusion plate (4) to have a stronger illumination than the center thereof. In addition, by means of the reflecting housing (2) reflecting the light sources of the radiating members (3) that do not cast at the optical plate (1), the luminosity of the entire device could be promoted. Especially, the closer the near middle portion of the rising area (11) is positioned to the diffusion plate (4), the stronger the illumination could be scattered from the diffusion plate (4). Thus, the conventional uneven illumination between the periphery of the diffusion plate (4) and the center thereof could be prevented. Namely, the diffusion plate (4) is able to provide a constant illumination to form a radiating surface with an even brightness. Further, since the radiating members (3) serve to surround the periphery of the optical plate (1), the occurrence of a stronger illumination on the sides of the radiating members (3) and a weaker illumination on the position that is not provided with the radiating members (3) could be preferably prevented. Further, since the optical plate (1) has at least one rising area (11) on the center thereof, and the radiating members (3) are arranged around the periphery of the optical plate (1), the light source could be reflected with multiple angles on the optical plate (1) for achieving a more even emission from the diffusion plate (4).

Figure 7:
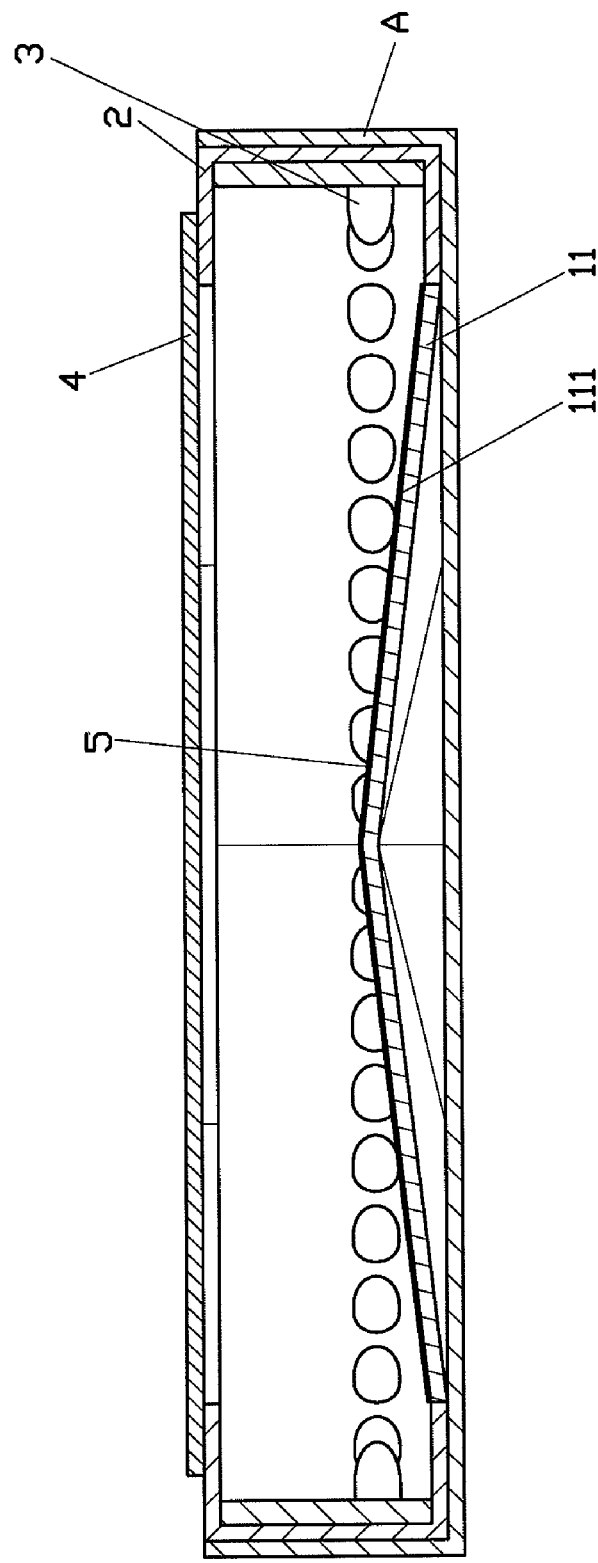
FIG. 7 is a schematic view showing an optical film provided on the rising surface.

Referring to FIG. 7, the rising surface (111) is provided with an optical film (5) that is formed by electroplating, evaporation, or sputtering. Wherein, the optical film (5) is served to adjust the emission direction and increase the reflecting rate, so that the light source emitted from the diffusion plate (4) could be further advanced to enhance the illumination thereof.

Figure 8:
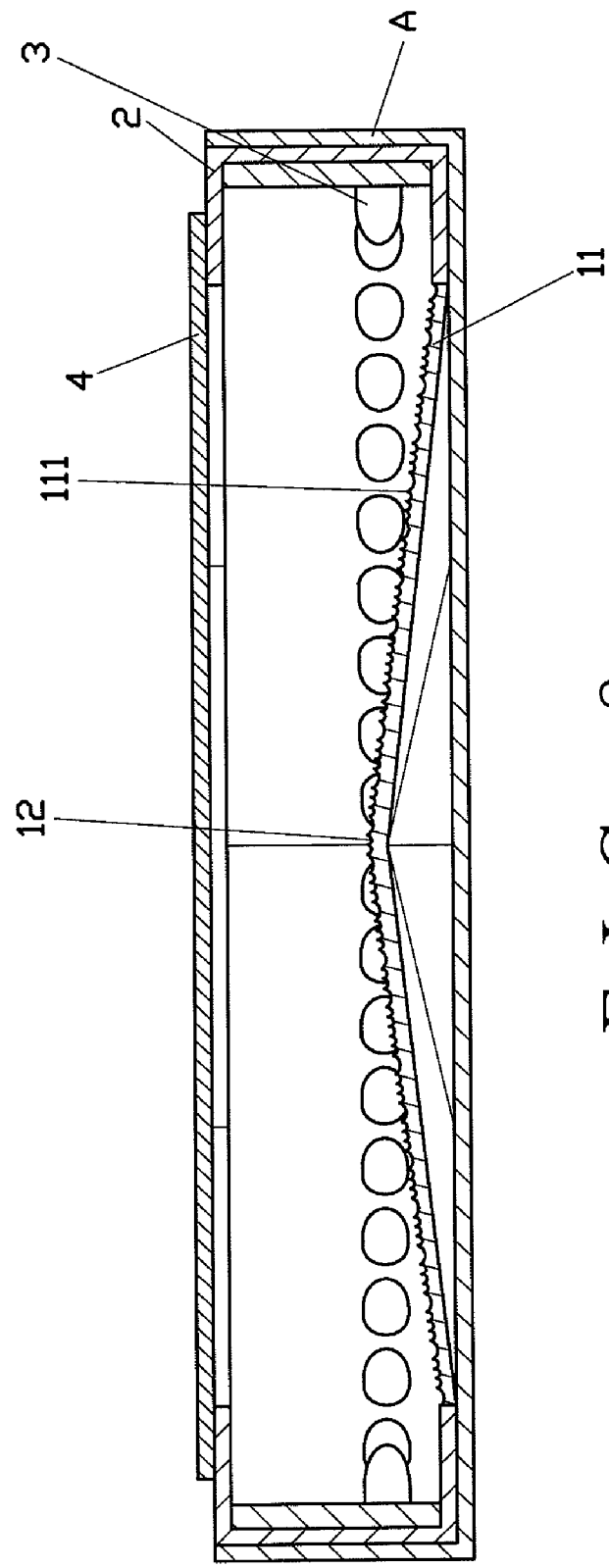
FIG. 8 is a schematic view showing irregular notches formed on the rising surface.

Referring to FIG. 8, the rising surface (111) is formed with a plurality of irregular notches (12) by through a sandblasting or a shot peening. Wherein, when the light sources cast at the notches (12) on the rising surface (111), a more average reflection and scattering could be achieved so as to enhance a more even brightness emitted from the radiating surface of the diffusion plate (4).

Figure 9:
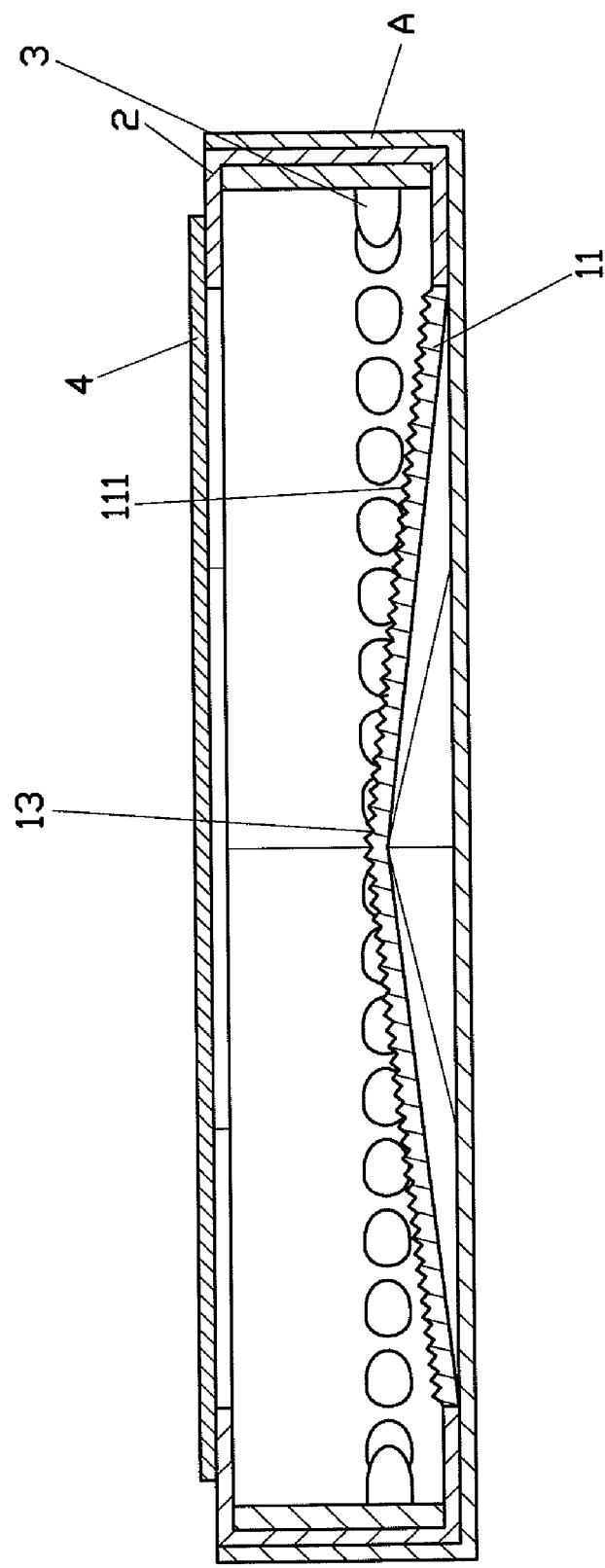
FIG. 9 is a schematic view showing the V-shaped notches formed on the rising surface.

Referring to FIG. 9, a plurality of V-shaped notches (13) are formed on the rising surface (111), thereby reflecting the light sources that cast on the rising surface (111) towards the diffusion plate (4). Therefore, the light sources emitted from the diffusion plate (4) are able to enhance the illumination.

Figure 10:
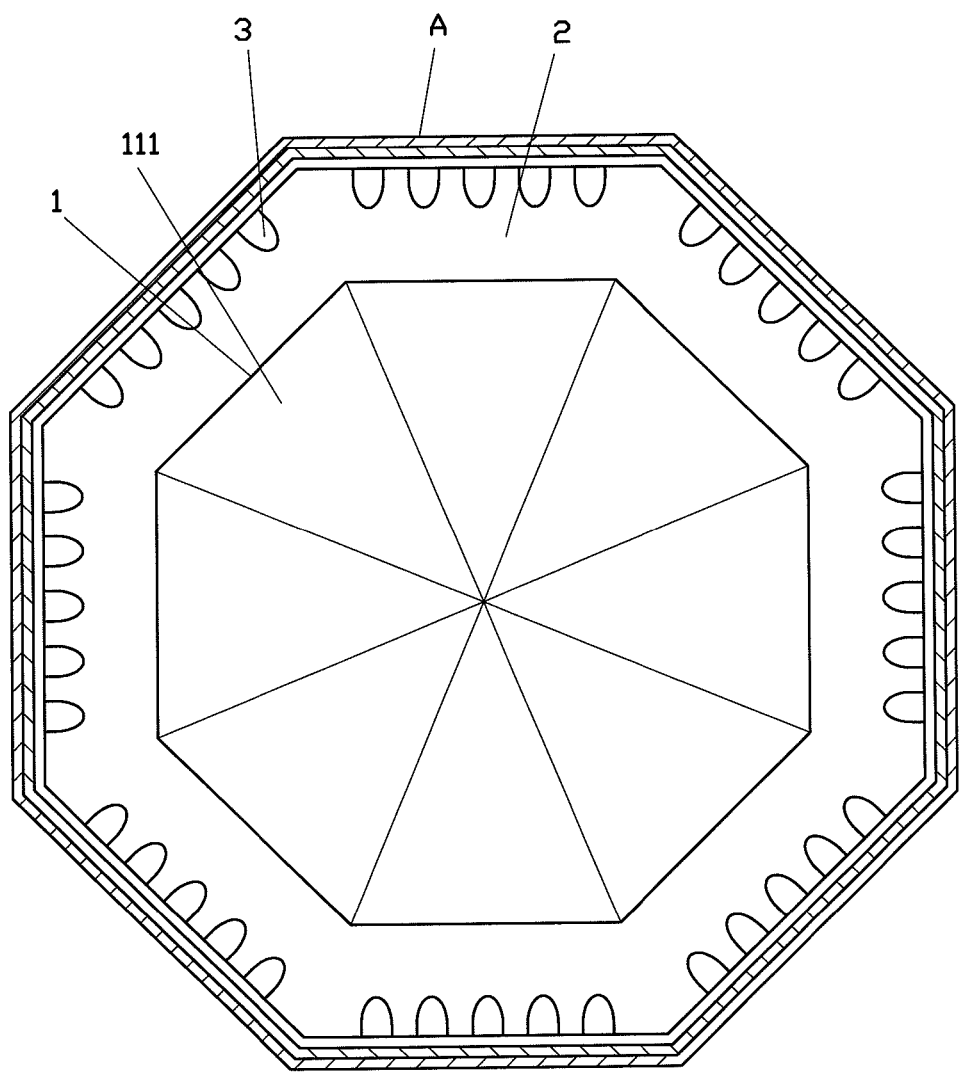
FIG. 10 is a schematic view showing the optical plate in an octagon shape.

Referring to FIG. 10, the optical plate (1) has an octagon shape. Whereby, the more the number of the side of the optical plate (1) possesses, a more smooth joint between the sides is formed. Thereby, the light sources could achieve a more even distribution of light on the optical plate, thence allowing the turning portions between the sides to be prevented from a lower brightness.

We claim:

1. A polygonal radiation module having radiating members without a light guiding board, comprising:
    an optical plate formed by a polygon including at least one rising area defined at a center thereof, said rising area being formed by a rising surface;
    a plurality of radiating members surrounding a periphery of said optical plate; wherein, radiant half-intensity angles of said radiating members being defined below 15 degrees, and said radiating members respectively radiating through optic axial directions that face to said rising surface; a radiation field being diffusively formed from a pivoting of said optic axial directions to cast at said rising surface; and
    a diffusion plate disposed above said rising area of said optical plate.

2. The polygonal radiating module as claimed in claim 1, wherein, said radiant half-intensity angles of said radiating members are defined between 5 degrees to 15 degrees.

3. The polygonal radiation module as claimed in claim 2, wherein, said radiating members are light emitting diode tubes.

4. The polygonal radiation module as claimed in claim 3, wherein, a reflecting housing is connected to said periphery of said optical plate, said radiating members are fixed in said reflecting housing, and said diffusion plate is connected to said reflecting housing.

5. The polygonal radiating module as claimed in claim 4, wherein, an optical film is provided on said optical plate.

6. The polygonal radiating module as claimed in claim 4, wherein, a plurality of irregular notches are formed on said rising surface of said rising area of said optical plate.

7. The polygonal radiating module as claimed in claim 4, wherein, a plurality of V-shaped notches are formed on said rising surface of said rising area of said optical plate.

* * * * *